Feb. 18, 1941.                H. H. RICKEY                2,231,948
                        WHEEL BALANCING WEIGHT
                           Filed April 3, 1939
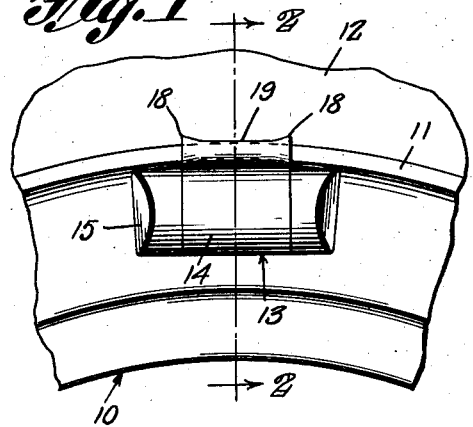
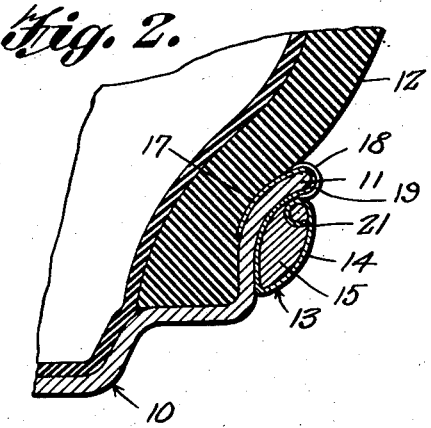
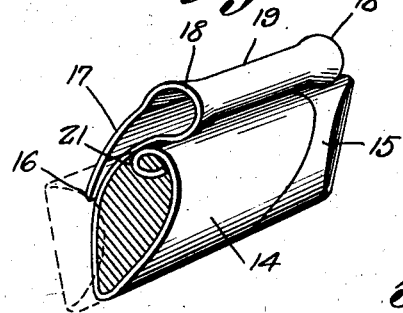
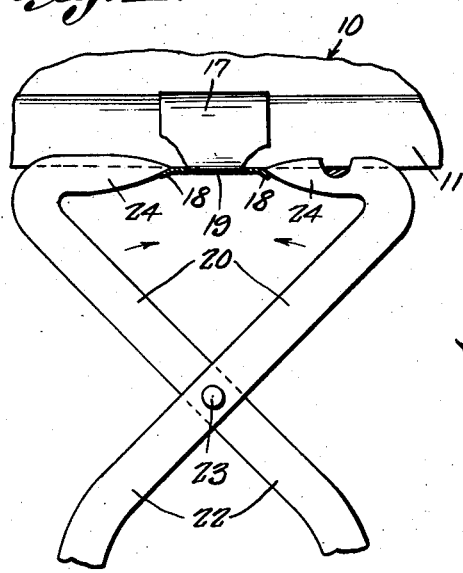
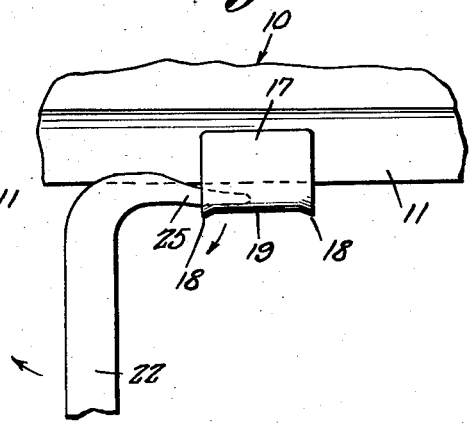
Herbert H. Rickey,
INVENTOR
BY Victor J. Evans & Co.
ATTORNEYS
WITNESS Patented Feb. 18, 1941

2,231,948

UNITED STATES PATENT OFFICE 2,231,948

WHEEL BALANCING WEIGHT

Herbert H. Rickey, Pawtucket, R. I.

Application April 3, 1939, Serial No. 265,834

2 Claims. (Cl. 301—5)

The present invention relates to a balancing device for automobile wheels and is adapted to be applied to the tire retaining flange forming a part of the wheel with which the automobile tire is associated.

As is well known, an automobile wheel usually becomes out of balance after it has been subjected to considerable hard usage. This is frequently caused by irregularities within the tire itself which creates an eccentric weight which necessitates the balancing of the wheel after the tire has been mounted on the rim.

An important object of the present invention resides in the provision of a means for balancing automobile wheels whereby to overcome the above disadvantages.

A further object of the invention is to provide a device that is adapted to be mounted on the wheel rim in such a manner that the centrifugal force produced when the wheel is rotating assists in holding the device in position.

A still further object of the invention resides in the provision of a wheel balancing device including a clip having an extended and bent portion to provide a hook adapted to engage the tire retaining flanges of the rim, the body portion of the clip being formed for receiving and supporting a weighted element and having the other end of the clip coiled and embedded within the weighted element whereby it is fixedly held therein. The extended and bent portion providing the hook is formed with outwardly extending end portions for receiving a tool whereby the entire device can be removed from the rim while retaining the tire thereon in an inflated condition.

The invention will be fully and comprehensively understood from a consideration of the following detailed description when read in connection with the accompanying drawing which forms a part of the application.

In the drawing:

Figure 1 is a fragmentary side elevational view of a tire rim with the balancing device embodying the features of the present invention supported thereon.

Figure 2 is a vertical sectional view taken substantially on line 2—2 of Figure 1.

Figure 3 is a perspective view of the clip and weighted element removed from the tire rim.

Figure 4 is a top plan view illustrating the first operation of removing the clip from the rim, and Figure 5 is a top plan view illustrating the second and final step of removing the clip from the rim.

Referring to the drawing for a more detailed description thereof, a conventional tire retaining rim of the type supported on a vehicle wheel, is indicated generally by the reference numeral 10 and comprises upwardly and outwardly extending flanges 11 which grip and retain the tire 12 in position thereon. The wheel balancing device generally designated by the numeral 13 is adapted to be positioned on the flange 11 at the desired position to overcome the defects of the wheel and includes a clip 14 and weighted element 15 carried thereby. The clip 14 is preferably formed of a strip of resilient material and has one end 16 extended and bent at substantially right angles to the body portion of the clip to provide a hook 17 adapted to be engaged with the rim of the wheel and to be held thereon by means of the tire as more clearly shown in Figure 2 of the drawing. The ends 18 of the hook 17 are raised so as to extend above the central portion 19 thereof to permit the insertion of a tool of the type generally designated at 20 in Figures 4 and 5 of the drawing to permit removal of the device while retaining the tire in an inflated condition as will be hereinafter more fully described.

The body portion of the clip 14 is substantially oval-shaped in cross section and the other end thereof is coiled as indicated at 21 and embedded in the weight 15. The weight 15 may be formed of any desired material such as lead or the like which in the fabrication of the device, is in a plastic or semi-plastic condition. During fabrication the lead or other material of which the weight is formed is placed within the oval-shaped portion of the clip 14 and extends beyond each end thereof as is clearly shown in the drawing with the coiled portion 21 securely embedded in the weight. After solidifying the weight 15 is securely and permanently held within the clip 14.

It is to be noted that the clip 14 and weight 15 are of a design so that when applied to the rim of the wheel the device will snugly engage the rim beneath the flanged portion thereof with the hooked end overlying the flange and held in position by the weight of the tire and the frictional contact of the clip with the flange. When desiring to remove the clip without deflating the tire use is made of an implement of the type shown in the drawing designated by the numeral 20 which comprises a pair of handles 22 pivotally connected at 23, the end portions thereof being formed with horizontally extending hook portions 24. The outer faces of the hook portions 24 are formed with a channel or groove adapted to ride along the flange 11 of the rim for guiding the same into contact with the clip. To remove the clip, the implement is first positioned as shown in Figure 4 of the drawing with the hook portions 24 engaged beneath the extended portions 18. Urging the jaws 24 toward each other by exerting pressure on the handle 22 the hook end 17 will be caused to be disengaged from the rim and moved to the position shown in Figure 5 of the drawing, whereupon the opposite end of the handle 22 of the implement 20, which is provided with the claw-like member 25, is disposed between the central portion 19 of the clip 14 and the flange of the rim and is urged outwardly in the manner shown. The clip is then completely removed from the rim and the tire remains in an inflated condition. Heretofore it has been necessary to deflate the tires when removing similar devices from the rim.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. A balancing device for an automobile wheel having a rim and tire retaining flange thereon, comprising a body portion forming a clip having one end extended and bent to provide a hook adapted to engage the tire retaining flange of the rim, said body portion being substantially oval-shaped in cross section, and supporting therein a weighted element, the other end of said clip being coiled and embedded within said weighted element, and means forming a part of said extended and and at the junction of said hook and body portion for receiving a tool bent end to remove said device from said rim while retaining the tire thereon in an inflated condition.

2. A balancing device for an automobile wheel having a rim and tire retaining flange thereon, comprising a body portion forming a clip having one end extended and bent to provide a hook adapted to engage the tire retaining flange of the rim, said body portion being substantially oval-shaped in cross section, a weighted element supported within said body portion and extending beyond each end thereof, the other end of said clip being coiled and embedded within said weighted element, tool-receiving portions provided at each side of the junction of the hook and body portion whereby said device can be removed from said rim while retaining the tire thereon in an inflated condition.

HERBERT H. RICKEY.